May 28, 1968  M. L. BENJAMIN ET AL  3,385,606

COLLET CHUCK

Filed April 6, 1965

INVENTORS.
MILTON L. BENJAMIN
DAVID D. WALKER
BY Oberlin, Maky & Donnelly
ATTORNEYS United States Patent Office 3,385,606
Patented May 28, 1968

3,385,606
COLLET CHUCK
Milton L. Benjamin, Shaker Heights, and David D. Walker, Chagrin Falls, Ohio, assignors to Erickson Tool Company, Solon, Ohio, a corporation of Ohio
Filed Apr. 6, 1965, Ser. No. 445,915
5 Claims. (Cl. 279—49)

ABSTRACT OF THE DISCLOSURE

A chuck having interengageable faces on the nosepiece, nose ring, and collet for effecting axial inward and outward movements of the collet in response to turning of the nosepiece in opposite directions. Line contact between the interengageable faces on the nosepiece and nose ring enables tilting of the nosepiece with respect to the nose ring and collet.

The present invention relates generally as indicated to a collet chuck in which a drill, reamer, tap or like tool, or a workpiece is gripped by a contractible collet.

In chucks of this type, a contractible collet is received in the tapered bore of a chuck body, the collet being formed with a correspondingly tapered external surface so that when forced axially inward of the body it will be radially contracted into gripping engagement with the tool or workpiece positioned therewithin. When the chuck is employed for heavy duty work, it is desirable that the angle of the tapered bore in the chuck body and correspondingly tapered portion of the collet be quite small, for example, 8 to 10° included angle, in order to increase the wedge action between the collet and shank so as to provide correspondingly increased gripping action. However, unless the angle be considerably greater than just indicated, for example, exceeds 15 or 20° included angle, the collet will not be self-releasing, that is, it will remain wedged in the body even though axial inward pressure thereon is removed.

One principal object of the invention is to provide a chuck in which the collet is positively actuated axially inwardly and outwardly with reference to the chuck body thus to permit use of small wedge angles as above indicated between the tapered bore of the chuck body and the tapered external surface of the collet.

Another object of this invention is to provide a chuck having great accuracy in the gripping of tools and the like in coaxial alignment with the chuck body.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

Figures 1, 2, 3, 4, 5:
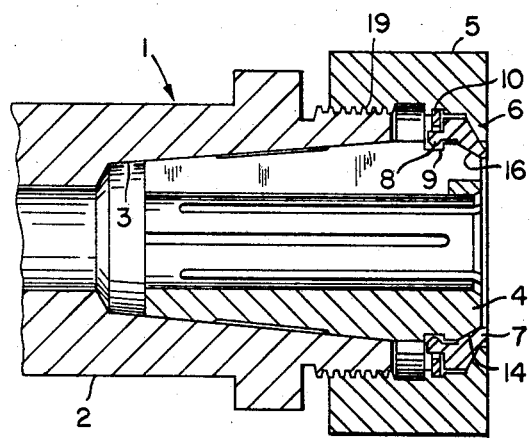
FIG. 1 is a longitudinal cross-section view of one embodiment of the present invention, such section having been taken substantially along the line 1—1, FIG. 2.
FIG. 2 is an end elevation view as viewed from the right-hand side of FIG. 1.
FIG. 3 is a fragmentary radial cross-section view on much enlarged scale of a portion of the chuck illustrated in FIGS. 1 and 2.
FIGS. 4 and 5 are fragmentary radial cross-section views on much enlarged scale similar to that of FIG. 3 except illustrating modified forms of collet chucks embodying the present invention.

Referring now more particularly to the drawing, and first to FIGS. 1 to 3, the chuck 1 therein shown comprises a chuck body 2 having a tapered bore 3 in which is received the correspondingly externally tapered contractible collet 4, said collet 4 being alternately slotted through its opposite ends to render the same contractible when moved axially against said tapered bore 3. For so axially moving the collet 4 there is provided a nosepiece 5 having threaded engagement with the chuck body 2 and having an inturned flange 6 which radially overlaps a nose ring 7 therewithin, the nose ring 7, in turn, being engageable with the beveled end portion of the collet 4. As evident, when the nosepiece 5 is turned to advance it toward the left as viewed in FIG. 1 corresponding leftward movement of the nose ring 7 will press the collet 4 axially against the tapered bore 3 in the chuck body 2 to effect contraction of the collet on the shank of a tool or the like (not shown) disposed therewithin.

If, as shown, the tapered bore 3 is of such small taper (e.g. 8° to 10° included angle) that the collet 4 is not self-releasing, there will be provided on the nose ring 7 an internal rib 8 which extends into a peripheral groove 9 in the collet 4. The nose ring 7 is retained in the nosepiece 5 as by means of the snap ring 10, and when the nosepiece 5 is turned to move it toward the right as viewed in FIG. 1, the snap ring 10 will engage the shoulder 11 of the nose ring 7 to move it toward the right, and the beveled face 12 of the inturned rib 8 will engage the side of groove 9 to forcefully withdraw the collet 4 away from the tapered bore 3 so that the collet 4 may expand to its normal condition to release the grip on the tool or workpiece therewithin. Desirably the shoulder 11 is axially outwardly spaced from the rib 8 and the snap ring 10 encircles the rib 8 to provide a more compact nosepiece-nose ring assembly. When there is no tool or workpiece in the collet 4, the beveled face 12 of the rib 8 acts as a cam surface, whereby the collet 4 may be pulled or pushed out of the nose ring 7 for replacement with a collet of different size for gripping a different tool or workpiece. When a replacement collet 4 is inserted, the beveled face 14 of the collet 4 and the beveled face 15 of the rib 8 coact to facilitate axial insertion of the new collet so that it snaps out to the position best shown in FIG. 3.

In gripping cylindrical shanks of tools, it is noted that about three-fourths of the length of the collet 4 is pressed into firm engagement with the tool shank by engagement of the collet 4 with the long tapered bore 3 to maintain the tool coaxial with the tapered bore 3 and chuck body 2. Furthermore, by reason of the provision of the beveled face 14 at the end of the collet 4 engaged with the beveled face 16 of the nose ring 7, the remaining overhanging portion of the length of the collet 4 is pressed radially against the tool shank. An included angle of about 60° for the faces 14 and 16 has been found suitable so that the axial force component on the collet 4 is greater than such radial force component. These beveled interengaged faces 16 and 14 of the nose ring 7 and collet 4 serve to locate the nose ring 7 coaxially of the collet 4 and chuck body 2, and because the included angle of such beveled faces 16 and 14 is less than that (preferably 120°) of the faces 17 and 18 of the nose ring 7 and nosepiece 5, the nose ring 7 will be held against turning when the nosepiece 5 is turned.

It has been discovered that when the face 17 is spherical and tangent to the frusto-conical face 18, eccentricity in the threads 19 will not cause the nose ring 7 or outer end portion of the collet 4 to be shifted out of coaxial relation to the axis of body 2. Thus, if there is any eccentricity as aforesaid, the nosepiece 5 will be tilted slightly as permitted by normal thread clearances so as to maintain line contact of its face 18 around the spherical face 17 of the nose ring 7 without tending to throw off the nose ring 7 either eccentrically or angularly. In this way, great accuracy is achieved in holding a tool or workpiece with its axis coinciding with the axis of the tapered bore in the body.

The chuck of FIG. 4 is generally similar to that illustrated in FIGS. 1 to 3, except that the nose ring is made in two separate parts 20 and 21 of which one part 20 engages the internally tapered face 23 of the inturned flange 24 of the nosepiece 25, and of which the other part 21 is engaged by the snap ring 26 to positively withdraw the collet 27 from the chuck body (not shown). In this case, the part 21 also has a plane annular face 28 which engages the plane annular side of the collet groove 29 for such positive withdrawal. To remove the collet 27 from the nosepiece assembly in FIG. 4 it is required to contract the collet 27 as by grasping the same in one hand and squeezing the same to a diameter such that the outer end portion will pass through the smallest diameter of the rib 30. The part 21 may be L-shaped as shown with the snap ring 26 encircling the rib 30 to provide a more compact nosepiece-nose ring assembly. As in FIG. 3, the part 20 has a spherical face 31 which engages the tapered face 23 of the nosepiece 25 to accommodate eccentricity and angular misalignment in the nosepiece and body threads.

The chuck illustrated in FIG. 5 is substantially the same as illustrated in FIG. 3 except that the face 32 of the nosepiece 33 like the spherical surface 17 of the nose ring is convex, it being a portion of a torus to provide line contact at 34 with such spherical surface 17.

Other modes of applying the principle of the invention may be employed, change being made as regards the details described, provided the features stated in any of the following claims, or the equivalent of such, be employed.

We therefore particularly point out and distinctly claim as our invention:

1. A chuck comprising a chuck body having a tapered bore; a collet contractable upon axial movement against said bore; a nosepiece having threaded engagement with said body; and a nose ring between said collet and said nosepiece; said nosepiece, nose ring and collet having interengageable radially overlapped faces to move said collet axially inwardly in response to tightening of said nosepiece in said body; means carried by said nosepiece for urging said nose ring axially outwardly in response to loosening of said nosepiece; and means on said nose ring for urging said collet axially outwardly along with said nose ring; the interengageable faces of said nose ring and nosepiece which urge said nose ring axially inwardly upon tightening of said nosepiece having line contact therebetween to enable tilting of said nosepiece with respect to said nose ring and collet, whereby eccentricity of said nosepiece with respect to said body will not cause said nose ring and collet to be shifted out of concentric relation with respect to said body; said means carried by said nosepiece for urging said nose ring axially outwardly in response to loosening of said nosepiece comprising a snap ring in a groove in said nosepiece which overlaps a shoulder portion on said nose ring; and said means on said nose ring for urging said collet axially outwardly along with said nose ring comprising an inturned rib on said nose ring extending into a peripheral groove in said collet; said shoulder on said nose ring being axially outwardly spaced from said rib and said snap ring encircling said rib to provide a compact nosepiece-nose ring assembly.

2. The chuck of claim 1 wherein said interengageable faces of said nose ring and nosepiece which urge said nose ring axially inwardly upon tightening of said nosepiece as aforesaid are respectively spherical and a portion of a torus, both of said last-mentioned faces being convex.

3. The chuck of claim 1 wherein both sides of said rib are tapered to provide cam means to facilitate assembly and disassembly of said collet and nose ring.

4. The chuck of claim 1 wherein said nosepiece is formed in two parts, one of said parts having said radially overlapped faces, and the other part being of generally L-shape and having said rib encircled by said snap ring as aforesaid to provide such compact nosepiece-nose ring assembly.

5. A chuck comprising a chuck body having a tapered bore; a collet contractable upon axial movement against said bore; a nosepiece having threaded engagement with said body; and a nose ring between said collet and said nosepiece; said nosepiece, nose ring and collet having interengageable radially overlapped faces to move said collet axially inwardly in response to tightening of said nosepiece in said body; means carried by said nosepiece for urging said nose ring axially outwardly in response to loosening of said nosepiece; and means on said nose ring for urging said collet axially outwardly along with said nose ring; said means carried by said nosepiece for urging said nose ring axially outwardly in response to loosening of said nosepiece comprising a snap ring in a groove in said nosepiece which overlaps a shoulder portion on said nose ring; and said means on said nose ring for urging said collet axially outwardly along with said nose ring comprising an inturned rib on said nose ring extending into a peripheral groove in said collet; said shoulder on said nose ring being axially outwardly spaced from said rib and said snap ring encircling said rib to provide a compact nosepiece-nose ring assembly.

References Cited

UNITED STATES PATENTS

| | | | |
|---|---|---|---|
| 2,272,185 | 2/1942 | Chittenden | 279—49 |
| 2,358,299 | 9/1944 | Benjamin et al. | 279—49 |
| 3,035,845 | 5/1962 | Benjamin | 279—47 |
| 3,195,909 | 7/1965 | Winnen | 279—51 |
| 3,332,693 | 7/1967 | Armstrong | 279—47 |

ROBERT C. RIORDON, *Primary Examiner.*

E. A. CARPENTER, *Assistant Examiner.*